(No Model.)
D. SMITH.
ICE MAKING.
No. 307,996. Patented Nov. 11, 1884.
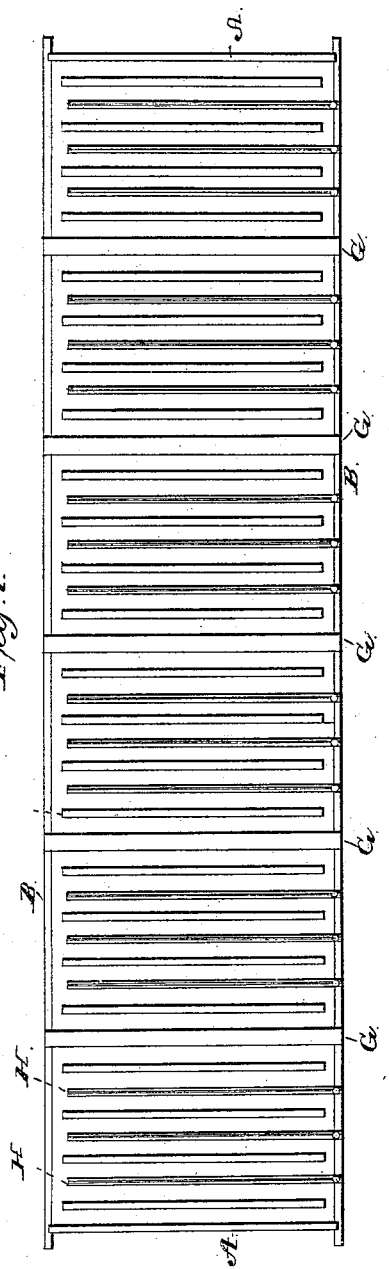
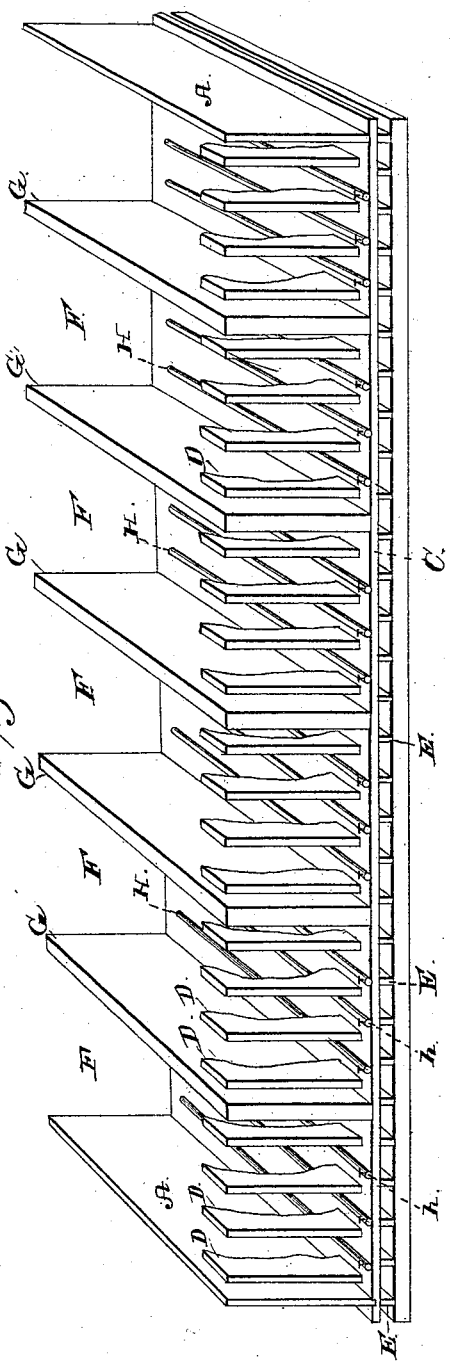
WITNESSES
H. A. Clark
Jno. C. Schroeder
INVENTOR
Dan'l Smith
by Geo. W. Dyer
Atty.

United States Patent Office.

DAVID SMITH, OF WASHINGTON, DISTRICT OF COLUMBIA.

ICE-MAKING.

SPECIFICATION forming part of Letters Patent No. 307,996, dated November 11, 1884.

Application filed February 26, 1884. (No model.)

*To all whom it may concern:*

Be it known that I, DAVID SMITH, of Washington, in the District of Columbia, have invented a new and useful Improvement in Ice-Making; and I do hereby declare that the following is a full and exact description of the same, reference being had to the accompanying drawings, and to the letters of reference marked thereon.
I have described in Reissue Letters Patent No. 7,383, granted to me November 7, 1876, and in an application filed February 21, 1883, details of my system and apparatus for making artificial ice, including the employment of freezing-tanks with numerous freezing-plates, and means whereby the water to be frozen is drawn off as it becomes turbid and passed through a filter and returned to the upper part of the tank purified, and with little change in temperature; but this last process or method, while it removed the insoluble and discoloring parts from the water, which were separated by the act of freezing, failed to remove the soluble parts—such as various salts—which, while not affecting the clearness of the water, caused the ice made from it to be opaque and commercially valueless, necessitating its removal at a considerable expense.

In my system as before described I froze the water contained in every part of the tank at the same time, and removed the ice from the tank at the same time, (beginning at one end for convenience,) until all the cakes of ice had been removed. Then the tanks were supplied with more fresh water and another freezing accomplished, and this again repeated several times. When this was done, there remained in the tank a considerable body of water which had not been frozen, which water, while not discolored, was more or less saturated with soluble matters. To remove this remaining water required the entire stoppage of the works, and consumed so much time, from the size of the tanks, that it was practically impossible to remove it after each act of freezing. My method of removing these soluble parts from the water to be frozen, as a part of a system of ice-making, and an apparatus suitable for that purpose, constitutes the improvements which are the subject of this application. In a general way, these improvements may be stated as dividing the freezing-tank into separate compartments, each of sufficient size for holding a few freezing-plates, and so adapted that the freezing water remaining in each after the cakes of ice are frozen may be rapidly drawn off and the interior of the compartment washed out with fresh water, and then the compartment filled with water for freezing and the act of freezing commenced in that compartment, and so on with each compartment in succession.

For the better comprehension of my method a form of apparatus suitable to carry it into operation is now described, and the same is illustrated in the drawings of this specification, in which—

Figure 1 is a top plan view of a compartment-tank, and Fig. 2 an elevation in perspective of the same with one of the side walls removed.

Similar letters denote corresponding parts in each figure.

The tank is composed of end walls, A, and side walls, B. Bottom C contains freezing-plates D, and stands upon cross-sills E, all as described or shown in my former patent, and in the application before referred to.

The tank is divided into several compartments, F, by partition-walls G, so as to make each compartment water-tight and of a size to include a few freezing-plates, from two to six being preferred. Pipes H, slightly inclined, extend along the bottom of each compartment, having openings $h$, sufficient in size and number to admit as much water as the pipes can deliver, and at their ends which extend through one wall of the tank are supplied with suitable cocks. In addition, each compartment has separate fresh-water and brine supply pipes and draw-off pipes. (Not shown in the drawings, but described in my former patent and application, before referred to.) In operation these compartments are filled with the fresh water to be frozen, and as soon as the ice is formed in one compartment it is removed therefrom and the remaining unfrozen water removed by means of the pipes H, and then a small quantity of fresh water is preferably admitted and allowed to flow out of such pipes to completely remove all impurities from the exposed surfaces in the compartment. After this the tank is supplied with water for freezing and the connection with the freezing-pipes opened and the act of freezing commenced. The same course is followed with the other compartments in succession, the engine or driving-works being at all times in operation. By this means, when the cakes of ice in one compartment are taken out, the water remaining can be removed and the compartment "flushed," if need be, and refilled in a few minutes, the engines being continuously at work and the act of freezing going on in the other compartments. It will be understood that this method of removing the soluble salts, &c., in the water may be used in addition to the system before referred to of removing the colored water by filtering and returning it clear and transparent to each compartment of the tank.

In my practical experience I have found that in fresh water no part of which is used more than once in making ice the soluble material in the water is not sufficient to affect seriously the quality of the ice, as these soluble parts, particularly the salts, are expelled from the water to a great degree by the act of freezing, and remain almost entirely in the water which has not been converted into ice, and in deposits upon the lower parts of the tank; but when this remaining water is retained, as is universally the case, because of its extreme coldness, and fresh water added for new charges, all the water becomes so saturated that the act of freezing will not expel the salts, &c., and therefore opaque ice is made. With my improvement, however, I find the ice made by it is clear and transparent through every portion, and the quantity of water in each compartment is so small that if left in the tank it would not sensibly affect the temperature of an added supply of fresh water, so that no appreciable loss would arise from the withdrawal of such remaining water, and being so small in quantity, it can be withdrawn with little loss of time, and without stoppage of the works.

Having thus described my invention, what I claim as new therein is—

1. In ice-making, the continuous method, substantially as described, of charging one compartment at a time of a freezing-tank with fresh water, freezing the same into ice, and then withdrawing the remaining water, whereby the soluble matters in the freezing water are withdrawn from each compartment in turn, and the same is cleansed without stoppage of the works or disturbance of any other compartment, as set forth.

2. A tank for making ice divided into separate compartments, each of which is provided with draw-off-water pipes at its bottom, substantially as described.

In testimony whereof I affix my signature in presence of two witnesses.

DAVID SMITH.

Witnesses:
E. D. WHITE,
GEO. H. COOPER.